Nov. 29, 1960 A. L. GIRARDI 2,961,991
FRUIT HARVESTING AND SPRAY MECHANISM
Filed June 4, 1956
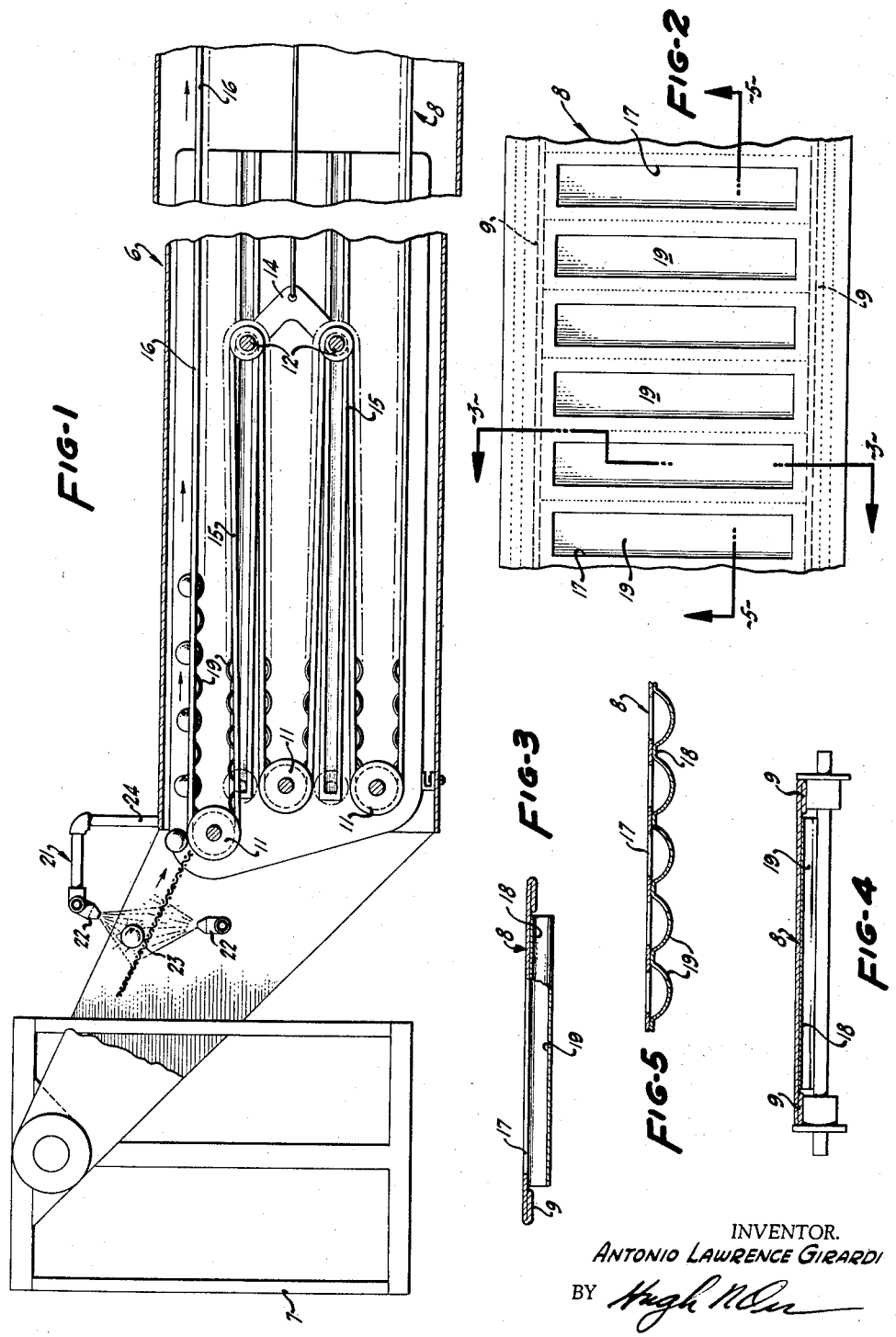
INVENTOR.
ANTONIO LAWRENCE GIRARDI
BY
ATTORNEY United States Patent Office 2,961,991
Patented Nov. 29, 1960

2,961,991

FRUIT HARVESTING AND SPRAY MECHANISM

Antonio Lawrence Girardi, Rte. 3, Box 324,
Stockton, Calif.

Filed June 4, 1956, Ser. No. 589,081

8 Claims. (Cl. 118—24)

This invention relates to fruit harvesting mechanism of the general character of the Orchard Apparatus disclosed in my copending applications Ser. No. 492,433, filed March 7, 1955 (Patent No. 2,798,623, dated July 9, 1957), and Ser. No. 570,165, filed March 7, 1956. More particularly, this invention relates to mechanism for treating and conveying fruit from the hands of a picker to a delivery station.

Fruits, especially peaches, are easily bruised; and bruises not only impair the grade and the value of the fruit, but contribute to the rapid deterioration of the fruit by facilitating attack by spores, fungi, and other organisms which cause spoilage. For example, the spores that cause "brown rot" in peaches are easily spread from one peach to another; and the mere contact of a sound peach with an infected piece of fruit, or even with an area with which the infected piece has come in contact, may initiate spoilage which will seriously affect the marketableness of the fruit. At the time a peach is picked, the infection may be so slight as to escape observation by the picker. Still, contact with other peaches, or with surfaces with which other peaches come in contact, may cause the infection to spread so widely and so rapidly that large amounts of fruit may be reduced below acceptable standards before the fruit can be delivered to and graded by the packer or canner.

It is among the objects of the present invention to provide mechanism which will convey fruit from a picking station to a delivery station with a minimum likelihood or bruising and with a minimum exposure to contact with spores and similar damaging organisms spread by previously picked fruit.

Another object is to provide a conveyor which may be extended by and with an axially and angularly adjustable boom, throughout the range of movement of the boom, to safely carry fruit from the point of picking to the point of delivery.

It is also an object of this invention to provide means for directing spray material (liquid, powder, or gaseous) onto the freshly picked fruit before it has been exposed to contamination by contact with infected fruit or contaminated surfaces.

A further object is to provide an extensible belt construction adapted to minimize injury to fruit, and to permit a wide range of longitudinal extension within a minimum of transverse cross-sectional area.

A still further object is to provide an extensible conveyor belt provided with collapsible pockets movable over idler pulleys of small diameter engaging either face of the belt, the belt being so constructed as to obtain compactness, economy in construction, and efficiency in operation.

The invention has other objects and features of advantage, some of which, with the foregoing, will be hereinafter explained in connection with the illustrative embodiment of the invention shown in the accompanying drawings forming a part of the present specification. It is to be understood that the invention is not limited to the structural features shown in the drawings, as the invention may be embodied in other forms and the structural details may be variously modified within the scope of the appended claims.

In the drawings:

Fig. 1 is a fragmental side elevational view, partly in longitudinal vertical section, of a portion of a fruit picker's boom equipped with fruit treating and conveying mechanism embodying the present invention;

Fig. 2 is a fragmental plan view of a portion of a conveyor belt made in accordance with the present invention;

Fig. 3 is a fragmental transverse sectional view of the conveyor belt, the plane of the section being indicated by the line 3—3 of Fig. 2;

Fig. 4 is a transverse sectional detail showing the manner in which the collapsible pockets move over the idler pulleys; and Fig. 5 is a fragmental longitudinal sectional view, the plane of the section being indicated by the line 5—5 of Fig. 2.

In terms of broad inclusion, the device of the present invention comprises an extensible conveyor belt, movable by and with an extensible boom of a fruit picking machine throughout its range of movement, said conveyor being mounted over pulleys movable with the boom to take in and pay out whatever length of conveyor is necessary to accommodate axial extension and retraction of the boom. The conveyor belt is provided with a fabric backing having loops matching with openings in the belt to form pockets for the reception of fruit, and said loops being collapsible to permit movement of the conveyor belt over pulleys engaging either the outer or inner surface of the belt. The invention also contemplates the provision of means for directing spray material onto the fruit as it is delivered onto the conveyor.

In terms of greater detail, and in reference to the illustrative embodiment shown in the drawings, the device of the present invention comprises an extensible boom of the general character disclosed in my co-pending applications above referred to, said boom being designated in general by the numeral 6. The boom is extensible axially, and is movable angularly about vertical and horizontal axes for manipulating a picker's cage or platform 7 about adjacent surfaces of adjacent trees, as fully explained in said co-pending applications.

Mounted upon and substantially within the boom is an extensible conveyor designated in general by the numeral 8. The conveyor comprises a strip of material, preferably canvas or equivalent fabric, having its side edges doubled inwardly as at 9, and having its ends joined to form an endless belt. The conveyor belt is extended over main pulleys 11 mounted upon the ends of the boom, and over a plurality of yieldably movable idler pulleys 12 mounted upon a movable yolk 14, as indicated in Fig. 1 of the drawings. The idler pulleys 12 engage loops 15 of the conveyor belt, the loops being payed out and drawn in to accommodate extension and retraction of the boom so that the upper reach 16 of the conveyor will extend from a point near the cage 7 to a delivery point near the base upon which the boom is supported at any position of the cage within the range of axial and angular movement of the boom.

Openings 17 are formed at regular intervals along the length of the conveyor belt 8. As illustrated, the openings extend transversely of the belt, terminating slightly inwardly from the inturned edges 9. A strip of fabric 18, preferably canvas of a weight substantially less than that of the conveyor belt 8, is secured to the back or underside of the belt 8. The strip 18 is stitched or otherwise secured to the belt 8 between adjacent openings 17, with loops 19 matching with the openings to form pockets in back of the openings. The strip 18, and the loops 19 thereof, is sufficiently flexible to collapse and lie flat against the back of the belt 8 as is passes over a pulley engaging the belt.

Spray mechanism designated in general by the numeral 21 is mounted adjacent the outer end of the boom 6 and conveyor 8. The spray mechanism preferably comprises a pair of spray heads 22 arranged to direct spray material onto pieces of fruit from above and below so as to effectively spray the entire surface of each piece of fruit. The spray may be directed onto the fruit as it rolls along a screen or chute 23 extending between the picker's cage and the end of the conveyor, so as to subject the fruit to the spraying treatment before it reaches the conveyor. This treatment prevents active spores from being transferred from one piece of fruit to another, or to the surface of the conveyor belt.

In operation, the upper reach 16 of the belt extends in a straight path from the outer end of the boom 6 to its base. Fruit is delivered onto the outer end of the conveyor as it is picked from the trees by a picker occupying the cage 7. As the fruit approaches the conveyor, it is completely sprayed with material suitable for destroying spores and the like without impairing the fruit. Any of the approved commercial sprays, and including dusting powders and gaseous materials, may be applied in accordance with conventional spraying specifications. The spray material may be delivered to the spray head 22 through suitable pipe connections 24, which may include a length of flexible hose, not shown, arranged to permit the extension and retraction of the boom without disturbing the spray connections.

The spray material carried by the fruit is spread onto the surface of the conveyor so that fruit touching an area previously touched by an infected piece of fruit will not also become infected. This treatment effectively prevents spoilage beyond allowable limits between the time the fruit is picked and the time it is normally reached for grading by the packer or canner.

I claim:

1. In a mobile orchard apparatus of the character described, an axially extensible boom, main conveyor pulleys journalled upon the boom adjacent its ends, an endless conveyor belt mounted over said main pulleys, idler pulleys engaging loops of the conveyor intermediate the main pulleys, said idler pulleys being yieldably movable to pay out and take in the loops in conformity with the extension and retraction of the boom, flexible pockets carried by the belt collapsible to pass over idler pulleys engaging either face of the conveyor belt, and a spray head mounted upon the outer end of the boom and positioned to direct spray material onto the fruit substantially as it is delivered onto the conveyor by a picker.

2. In a fruit harvesting machine, the combination with a substantially hollow boom extensible along its longitudinal axis and provided with a plurality of conveyor pulleys at least one of which is movable relative to the others of an endless belt extending over the pulleys and arranged to be lengthened and shortened in conformity with the extension and retraction of the boom by the relative movement of the pulleys, and pockets carried by the belt for conveying fruit from the outer end of the boom to its base, said pockets being collapsible to permit movement of the belt over pulleys intermediate the ends of the conveyor and engaging either side thereof, and means upon the outer end of the boom for directing spray material onto fruit at about the point of delivery thereof onto the conveyor.

3. In a fruit harvesting machine, the combination with an extensible boom and a conveyor extensible with the boom for carrying fruit from a receiving point adjacent the outer end of the boom to a delivery point adjacent the base end of the boom, of a foraminous chute positioned upon the outer end of the boom to direct fruit onto the receiving end of the conveyor, and spray heads mounted upon the outer end of the boom and positioned to direct spray material onto the fruit from different directions.

4. The combination defined by claim 3 wherein the chute is formed of screen mesh, a spray head being positioned below the chute for spraying the under surface of the fruit through the screen.

5. In a mobile orchard fruit picking apparatus of the character described, an axially extensible boom, a conveyor mounted upon the boom for movement therewith, said conveyor being extensible and retractable with the boom and being operable for conveying fruit from the outer end of the boom to the base thereof throughout the range of extension of the boom, and means upon the outer end of the boom positioned for directing spray material onto fruit substantially coincidentally with its delivery by a picker onto the conveyor.

6. In a mobile orchard fruit picking apparatus of the character described, an axially extensible boom, a conveyor mounted upon the boom for movement therewith, said conveyor being extensible and retractable with the boom and being operable for conveying fruit from the outer end of the boom to the base thereof throughout the range of extension of the boom, said conveyor comprising an endless belt provided with a plurality of collapsible pockets movable over pulleys substantially enclosed within the boom, and means upon the outer end of the boom positioned for directing spray material onto the fruit substantially coincidentally with its delivery by a picker onto the conveyor.

7. In a fruit harvesting machine, the combination with a substantially hollow boom extensible along its longitudinal axis and provided with a plurality of conveyor pulleys at least one of which is movable relative to the others, of an endless belt extending over the pulleys and arranged to be lengthened and shortened in conformity with the extension and retraction of the boom by the relative movement of the pulleys, said belt being substantially enclosed within the boom, pockets carried by the belt for conveying fruit from the outer end of the boom to the base thereof, said pockets being adapted to permit the movement of the belt over the pulleys intermediate the ends of the conveyor while the pulleys engage either face of the belt, and means upon the outer end of the boom for directing spray material onto the fruit at about the point of delivery thereof onto the conveyor.

8. In a fruit harvesting machine, the combination with a substantially hollow boom extensible along its longitudinal axis and provided with a plurality of conveyor pulleys at least one of which is movable relative to the others of an endless belt extending over the pulleys and arranged to be lengthened and shortened in conformity with the extension and retraction of the boom by the relative movement of the pulleys, pockets carried by the belt for conveying fruit from the outer end of the boom to the base thereof, said pockets being adapted to permit movement of the belt over pulleys intermediate the ends of the conveyor while the pulleys engage either face of the belt, a foraminous chute positioned to direct fruit onto the conveyor belt adjacent the outer end of the boom, and means mounted upon the boom and movable therewith for directing spray material onto fruit delivered onto the chute for movement therealong onto the conveyor belt.

References Cited in the file of this patent

UNITED STATES PATENTS

| | | |
|---|---|---|
| 1,422,656 | Brennan | July 11, 1922 |
| 1,656,890 | Schiff | Jan. 17, 1928 |
| 1,750,612 | Dallinga | Mar. 11, 1930 |
| 1,899,246 | Schiff | Feb. 28, 1933 |
| 1,953,698 | Wright | Apr. 3, 1934 |
| 2,420,368 | Giordano | May 13, 1947 |
| 2,436,657 | McCulloch | Feb. 24, 1948 |
| 2,543,915 | Leonard | Mar. 6, 1951 |
| 2,560,487 | Shugart et al. | July 10, 1951 |
| 2,578,427 | Hussey et al. | Dec. 11, 1951 |
| 2,640,582 | Maderira | June 2, 1953 |